United States Patent
Jen et al.

(10) Patent No.: US 8,137,648 B2
(45) Date of Patent: Mar. 20, 2012

(54) DIESEL ENGINE EXHAUST TREATMENT SYSTEM AND METHOD INCLUDING A PLATINUM GROUP METAL TRAPPING DEVICE

(75) Inventors: Hungwen Jen, Troy, MI (US); Giovanni Cavataio, Dearborn, MI (US); James W. Girard, Vienna (AT)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/902,447

(22) Filed: Oct. 12, 2010

(65) Prior Publication Data

US 2011/0138777 A1    Jun. 16, 2011

(51) Int. Cl.
*B01D 53/56* (2006.01)
*B01D 53/92* (2006.01)

(52) U.S. Cl. ............ 423/210; 60/299; 95/133; 422/168; 422/171; 423/213.7

(58) Field of Classification Search ............ 422/168, 422/171; 95/133; 60/299, 311; 75/410; 423/210, 213.7
See application file for complete search history.

(56) References Cited

U.S. PATENT DOCUMENTS

| | | | |
|---|---|---|---|
| 2,747,679 A * | 5/1956 | Ruthardt | 75/410 |
| 3,434,826 A * | 3/1969 | Holzmann | 75/410 |
| 3,954,449 A * | 5/1976 | Rudorfer et al. | 75/419 |
| 4,774,069 A * | 9/1988 | Handley | 423/403 |
| 5,069,697 A | 12/1991 | Hamaguchi et al. | |
| 5,727,385 A | 3/1998 | Hepburn | |
| 5,964,088 A | 10/1999 | Kinugasa et al. | |
| 6,047,542 A | 4/2000 | Kinugasa et al. | |
| 6,109,024 A | 8/2000 | Kinugasa et al. | |
| 6,133,185 A | 10/2000 | Kinugasa et al. | |
| 6,467,257 B1 | 10/2002 | Khair et al. | |
| 6,641,785 B1 | 11/2003 | Neufert et al. | |
| 6,677,264 B1 | 1/2004 | Klein et al. | |
| 6,928,806 B2 | 8/2005 | Tennison et al. | |
| 6,964,157 B2 | 11/2005 | Adelman et al. | |
| 7,062,904 B1 | 6/2006 | Hu et al. | |
| 7,094,728 B2 | 8/2006 | Yan et al. | |

(Continued)

FOREIGN PATENT DOCUMENTS

WO    2006045315 A1    5/2006

(Continued)

OTHER PUBLICATIONS

Jen et al., "Detection, Origin and Effect of Ultra-Low Platinum Contamination on Diesel-SCR Catalysts", Oct. 6, 2008, SAE International Technical Papers, 2008-01-2488, pp. 1553-1559.*

(Continued)

*Primary Examiner* — Jill Warden
*Assistant Examiner* — Joye L Woodard
(74) *Attorney, Agent, or Firm* — Dinsmore & Shohl LLP

(57) ABSTRACT

A diesel engine exhaust treatment system and method is provided which includes a platinum group metal trapping device (16) comprising cerium oxide or a perovskite material positioned between a diesel oxidation catalyst and an SCR catalyst. The platinum group metal trapping device traps trace amounts of platinum group metals which may be released from the diesel oxidation catalyst during engine operation and prevents them from accumulating on the SCR catalyst, preventing potential contamination of the SCR catalyst as well as ensuring that the performance of the SCR catalyst is uninhibited.

17 Claims, 3 Drawing Sheets

U.S. PATENT DOCUMENTS

| | | |
|---|---|---|
| 7,097,817 B2 | 8/2006 | Brisley et al. |
| 7,117,667 B2 | 10/2006 | Mital et al. |
| 7,119,044 B2 | 10/2006 | Wei et al. |
| 7,150,145 B2 | 12/2006 | Patchett et al. |
| 7,178,331 B2 | 2/2007 | Blakeman et al. |
| 7,181,906 B2 | 2/2007 | Dalla Betta et al. |
| 7,188,469 B2 | 3/2007 | Bonadies et al. |
| 7,189,375 B2 | 3/2007 | Molinier et al. |
| 7,213,395 B2 | 5/2007 | Hu et al. |
| 7,225,613 B2 | 6/2007 | Hammerle et al. |
| 7,257,941 B1 | 8/2007 | Reuter |
| 7,264,785 B2 | 9/2007 | Blakeman et al. |
| 7,332,135 B2 | 2/2008 | Gandhi et al. |
| 7,371,353 B2 | 5/2008 | Robel et al. |
| 7,622,418 B2 | 11/2009 | Tanaka et al. |
| 2003/0140620 A1* | 7/2003 | Shigapov et al. ............... 60/286 |
| 2004/0037754 A1 | 2/2004 | van Setten et al. |
| 2004/0076565 A1 | 4/2004 | Gandhi et al. |
| 2005/0031514 A1 | 2/2005 | Patchett et al. |
| 2005/0232830 A1 | 10/2005 | Bruck |
| 2006/0010859 A1 | 1/2006 | Yan et al. |
| 2006/0100098 A1 | 5/2006 | Ura et al. |
| 2006/0179825 A1 | 8/2006 | Hu et al. |
| 2006/0242947 A1 | 11/2006 | Kay et al. |
| 2006/0251548 A1 | 11/2006 | Willey et al. |
| 2006/0254258 A1 | 11/2006 | Blakeman et al. |
| 2007/0012032 A1 | 1/2007 | Hu |
| 2007/0056268 A1 | 3/2007 | McCarthy, Jr. |
| 2007/0079605 A1 | 4/2007 | Hu et al. |
| 2007/0128088 A1 | 6/2007 | Willey et al. |
| 2007/0144153 A1 | 6/2007 | Gandhi et al. |
| 2007/0144156 A1 | 6/2007 | Gandhi et al. |
| 2007/0157607 A1* | 7/2007 | Pfefferle ............... 60/285 |
| 2007/0157608 A1 | 7/2007 | Gandhi et al. |
| 2007/0196246 A1 | 8/2007 | Yano |
| 2007/0224093 A1 | 9/2007 | Miyairi et al. |
| 2007/0238605 A1 | 10/2007 | Strehlau et al. |
| 2007/0240402 A1 | 10/2007 | Andreasson et al. |
| 2007/0283681 A1 | 12/2007 | Makkee et al. |
| 2008/0006025 A1 | 1/2008 | McCarthy |
| 2008/0127634 A1 | 6/2008 | Cho et al. |
| 2008/0141661 A1 | 6/2008 | Voss et al. |
| 2008/0282670 A1 | 11/2008 | McCarthy, Jr. et al. |
| 2008/0292519 A1 | 11/2008 | Caudle et al. |
| 2008/0314031 A1 | 12/2008 | Shamis et al. |

FOREIGN PATENT DOCUMENTS

| | | |
|---|---|---|
| WO | 2007141638 A2 | 12/2007 |
| WO | 2008070551 A2 | 6/2008 |

OTHER PUBLICATIONS

Cavataio et al., "Impact and Prevention of Ultra-Low Contamination of Platinum Group Metals on SCR Catalysts Due to DOC Design", Apr. 20, 2009, SAE International Technical Papers, 2009-01-0627, pp. 204-216.*

Thomas Screen, "Platinum Group Metal Perovskite Catalysts", Apr. 2007; Platinum Metals Review, vol. 51 Issue 2, pp. 87-92, UK.

Timothy V. Johnson, "Diesel Emission Control in Review", 2009; SAE Int. J. Fuels Lubr, vol. 2 Issue 1, pp. 1-12.

Mark Jagner, et al., "Detection, Origin, and Effect of Ultra-Low Platinum Contamination on Diesel-SCR Catalysts", Oct. 6, 2008; SAE International Virtual Conference Center, p. 1.

D. Fino, et al., "Diesel Particulate Abatement via Wall-Flow Traps Based on Perovskite Catalysts", Sep.-Oct. 2003; PubMed, U.S. National Library of Medicine, National Institutes of Health; p. 1.

Orlando et al., "The reactions of NO2 and CH3CHO with Na-Y zeolite and the relevance to plasma-activated lean NOx catalysis", Science Direct, Catalysis Today 89 (2004) 151-157.

Tennison et al., "NOx Control Development With Urea SCR on a Diesel Passenger Car", SAE International, 2004 SAE World Congress, Detroit, Michigan, Mar. 8-11, 2004.

* cited by examiner

DIESEL ENGINE EXHAUST TREATMENT SYSTEM AND METHOD INCLUDING A PLATINUM GROUP METAL TRAPPING DEVICE

BACKGROUND OF THE INVENTION

Embodiments described herein relate to a diesel engine exhaust treatment system and method, and more particularly, to an exhaust treatment system and method which utilize a platinum group metal trapping device to prevent contamination of SCR catalysts.

Diesel engine exhaust treatment systems are known for use in converting gaseous emissions such as nitrogen oxides ($NO_x$) to environmentally acceptable compounds. Such systems typically include a diesel oxidation catalyst (DOC), a selective catalytic reduction catalyst (SCR), and a diesel particulate filter (DPF).

Diesel oxidation catalysts are placed in the exhaust gas stream of a diesel engine and typically contain platinum group metals (PGM), base metals, or a combination thereof. These catalysts promote the conversion of CO and HC emissions to carbon dioxide and water.

Selective catalytic reduction catalysts (SCR) are used to convert $NO_x$ to $N_2$ and typically comprise a base metal and utilize an ammonia reductant, typically in the form of aqueous urea, which is injected into the exhaust stream downstream from the diesel oxidation catalyst. After water vaporization and urea hydrolysis, the formed ammonia reacts with $NO_x$ in the exhaust gas stream on the SCR catalyst to form $N_2$.

A diesel particulate filter (DPF) collects soot or particulate matter from engine exhaust. A precious metal catalyst selected from platinum group metals is typically coated on the DPF for the removal of CO, HC, and $NH_3$ slip.

It has been observed that treatment systems which include diesel oxidation catalysts washcoated with platinum group metals may lose trace amounts of platinum or other platinum group metals under certain conditions, such as high temperature operation. The trace amounts of platinum group metals from the DOC sublime and then accumulate on the SCR catalyst positioned downstream from the DOC such that the function of the SCR catalyst is inhibited. This is due to the high activity of platinum group metals for ammonia oxidation which results in little or no ammonia being available for the SCR reaction. In addition, because platinum group metal catalysts generate $NO_x$ and $N_2O$ from ammonia, an increase in $NO_x$ levels could actually result when the SCR is inhibited due to platinum group metal poisoning. It has been discovered that platinum levels as low as 0.0005 wt % can have a significant impact on SCR performance. See, Jagner et al., "Detection, Origin, and Effect of Ultra-Low Platinum Contamination on Diesel-SCR Catalysts," SAE International Paper No. 2008-01-2488, (2008).

Accordingly, there is a need in the art for a diesel engine exhaust system which prevents the deposition of platinum group metals on an SCR positioned downstream from a diesel oxidation catalyst, and to a system which efficiently achieves conversion of combustion components and removal of particulates in the exhaust gas.

SUMMARY OF THE INVENTION

Embodiments of the invention meet those needs by providing a diesel engine exhaust treatment system and method which includes a platinum group metal trap positioned downstream from a diesel oxidation catalyst. The platinum group metal trap functions to trap trace amounts of platinum group metals released from the diesel oxidation catalyst so as to prevent deposition of the metals on an SCR catalyst positioned downstream from the diesel oxidation catalyst.

According to one aspect, a diesel exhaust gas treatment system is provided which comprises a diesel oxidation catalyst comprising a platinum group metal positioned in an exhaust stream, a platinum group metal trap positioned downstream from the diesel oxidation catalyst which traps platinum group metals released from the diesel oxidation catalyst, and a selective reduction catalyst (SCR) positioned downstream from the platinum group metal trap.

The diesel oxidation catalyst preferably comprises a combination of platinum and palladium. The SCR catalyst preferably comprises zeolite and a base metal selected from copper and iron.

In one embodiment, the platinum group metal trap comprises cerium oxide. In another embodiment, the platinum group metal trap comprises a perovskite material. The perovskite material preferably comprises $CaTiO_3$.

The treatment system preferably further includes a diesel particulate filter which may be positioned downstream from the SCR catalyst, downstream from the platinum group metal trap, or upstream from the platinum group metal trap.

In another embodiment, the treatment system further includes a lean $NO_x$ trap which may be positioned either upstream or downstream from the platinum group metal trap.

The treatment system preferably further includes a reductant delivery system for providing a source of ammonia or urea to the exhaust stream. The reductant delivery system is preferably positioned directly upstream from the SCR catalyst.

In another embodiment, a method for treating diesel engine exhaust gases is provided in which exhaust gases are passed through the exhaust gas treatment system containing the platinum group metal trap between a diesel oxidation catalyst and SCR catalyst, such that the platinum group metal trap reduces platinum group metal contamination on the SCR catalyst in comparison with an exhaust system which does not include a platinum group metal trap. The method preferably includes providing a source of ammonia or urea to the exhaust stream.

Accordingly, it is a feature of embodiments of the present invention to provide a diesel exhaust gas treatment system and method which utilizes a platinum group metal trap to trap platinum group metals released from a diesel oxidation catalyst to prevent contamination of an SCR catalyst.

Other features and advantages of the invention will be apparent from the following description, the accompanying drawings, and the appended claims.

DETAILED DESCRIPTION OF THE PREFERRED EMBODIMENTS

In a preferred embodiment, an exhaust treatment system is provided which includes a platinum group metal trap positioned between a diesel oxidation catalyst and an SCR catalyst. The system reduces the likelihood of contamination of the SCR catalyst so that its performance is not inhibited. Thus, the system including the platinum group metal trap reduces platinum group metal contamination when compared to an exhaust treatment system which does not include the trap, while still providing efficient removal of $NO_x$.

The platinum group metal trapping device may comprise a monolith washcoated with cerium-containing oxides at a loading of about 30 to 300 g/L. While not wishing to be limited by any specific theory of operation, it is believed that the strong interaction of cerium oxide with platinum facilitates the trapping of platinum group metals sublimed/released from the upstream DOC.

Alternatively, the platinum group metal trapping device may comprise a Perovskite material having the formula $ABO_3$, where A-B includes, but is not limited to, $Ca^{+2}$—$Ti^{+4}$, $Ba^{+2}$—$Ti^{+4}$, $Ln^{+3}$—$Co^{+3}$, or $La^{+3}$—$Fe^{+3}$. Perovskite materials with relatively high surface areas may be prepared by a sol-gel method using the corresponding metal alkoxides. The perovskite material preferably comprises $CaTiO_3$, which may be prepared by combining calcium nitrate ($Ca(NO_3)_2$) and tetraisopropyl titanate ($Ti(i-C_3H_7O)_4$ at a ratio of Ca/Ti of 1:1. For example, the calcium nitrate and tetraisopropyl titanate may be dissolved in 2-methoxy ethanol, and a small amount of nitric acid may be added to form a precursor solution which is then dried, pyrolyzed at about 400° C., and then heated in air at about 600 to 800° C.

Alternatively, $CaTiO_3$ may be prepared by combining ($Ca(NO_3)_2$) with ethyl alcohol, water, and $HNO_3$ to form a solution. This solution is added dropwise into a solution of ($Ti(i-C_3H_7O)_4$ and ethyl alcohol (at a ratio of Ca/Ti of 1:1). The solution may be evaporated to a dry powder at 200° C. and then calcined at about 600° C. These methods produce a $CaTiO_3$ powder having a particle size of about 22 to 50 nm.

The $CaTiO_3$ perovskite material may be washcoated on a honeycomb substrate using a slurry solution containing the fine perovskite powder. The slurry solution may optionally contain one or more of alumina, zirconia ($ZrO_2$), ceria ($CeO_2$), and Ce—Zr mixed oxide ($Ce_xZr_{1-x}O_2$). The washcoat loading may vary from about 50 to about 350 g/L.

The $CaTiO_3$ washcoated substrate functions to trap sublimed precious metals which may be released from the diesel oxidation catalyst. Again, while not wishing to be limited by any specific theory of operation, it is believed that the trace amounts of platinum group metals released from the DOC become trapped in the lattice structure of the material.

Figure 1:
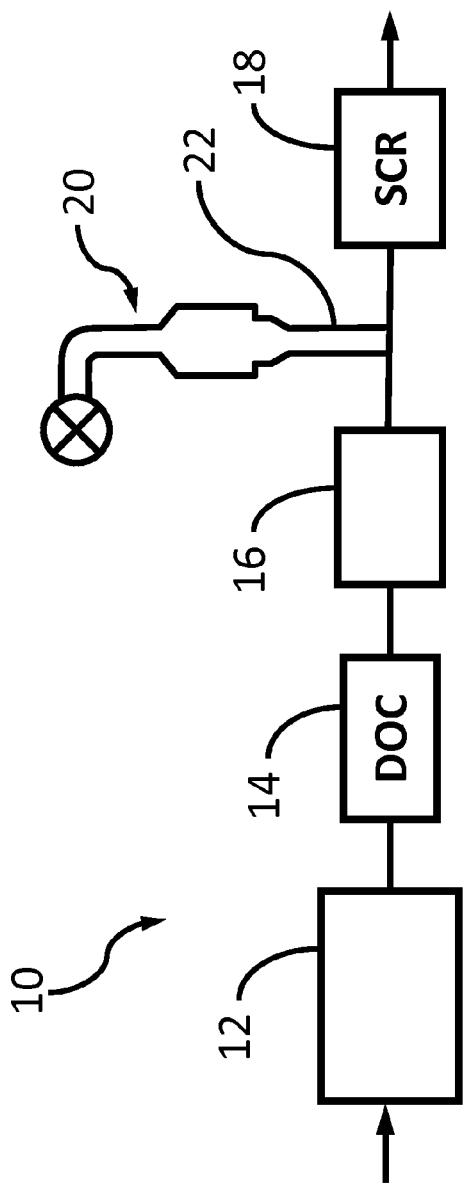
FIG. 1 is a schematic illustration of a diesel engine exhaust treatment system in accordance with an embodiment of the invention.

Referring now to FIG. 1, one embodiment of the diesel exhaust treatment system 10 is illustrated. As shown in its simplest form, the exhaust treatment system is coupled to an exhaust manifold 12 of a diesel engine and includes a diesel oxidation catalyst 14 which is positioned upstream from an SCR catalyst 18. The system includes a platinum group metal trap 16 between the DOC and SCR catalyst.

The diesel oxidation catalyst 14 is coated on a refractory inorganic oxide or ceramic honeycomb substrate as a washcoat at a loading of from about 30 to about 300 g/L and utilizes a catalyst material selected from platinum, palladium, or a combination thereof, and may also contain zeolites. The washcoat may further comprise a binder such as alumina, silica, titania, or zirconia.

The SCR catalyst 18 comprises a zeolite and a base metal selected from copper and iron. The SCR catalyst washcoat is coated at a loading of from about 30 to about 300 g/L and may be prepared by coating a porous inert substrate with a slurry containing a base metal, zeolite, and binder material such as alumina, silica, titania or zirconia. Alternatively, the base metal/zeolite may be combined with ceramic binders/fibers and extruded into a monolith.

Referring again to FIG. 1, the treatment system preferably further includes a reductant delivery system 20 which is coupled to the exhaust manifold directly upstream from the SCR catalyst 18. A reductant, such as ammonia, aqueous urea or other ammonia-generating compounds, is stored in a storage vessel (not shown) and delivered to the reductant delivery system in metered amounts, typically in the form of a vaporized mixture of the reductant and water. The reductant delivery system includes an injector 22 for injecting an appropriate amount of reductant into the exhaust stream at the appropriate time.

Figure 2:
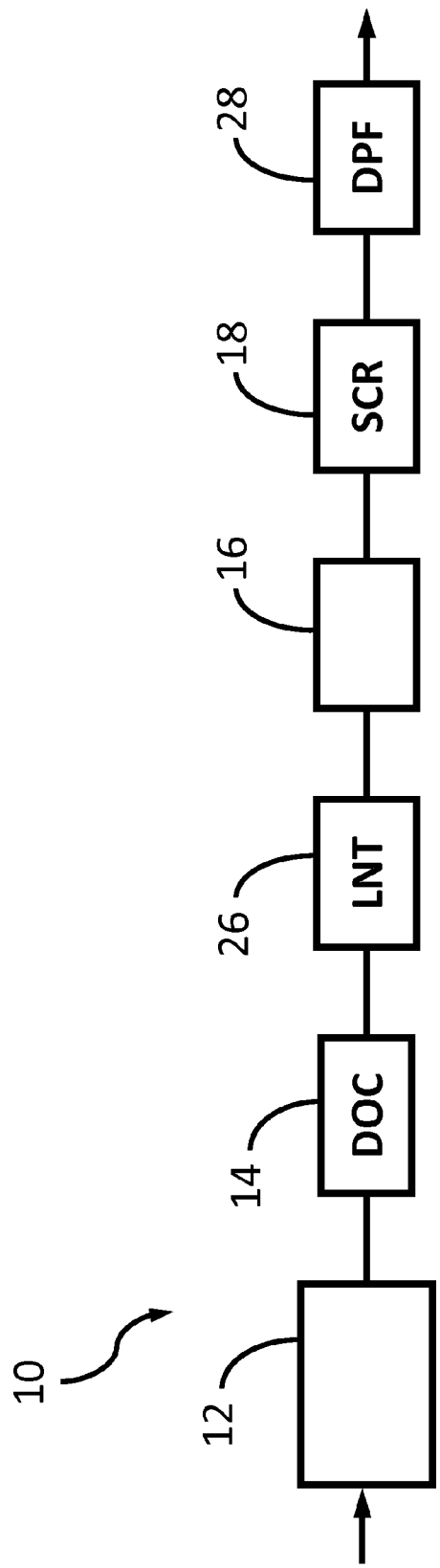
FIG. 2 is a schematic illustration of another embodiment of the invention including a lean $NO_x$ trap and a diesel particulate filter.

In another embodiment of the invention illustrated in FIG. 2, the exhaust treatment system may further optionally include a lean $NO_x$ trap (LNT) 26 positioned downstream from the DOC 14 to aid in further reduction of $NO_x$ in the exhaust gas. The LNT 26 comprises one or more platinum group metals, and preferably comprises a mixture of platinum, palladium, and rhodium. Preferably, the lean $NO_x$ trap has a precious metal loading of from between about 30 to about 300 g/ft$^3$. The lean $NO_x$ trap further comprises a $NO_x$ adsorbent material selected from one or more alkali or alkaline earth metals.

It should be appreciated that in embodiments which include a lean $NO_x$ trap, the use of the reductant delivery system is optional as the lean $NO_x$ trap generates ammonia during its operation.

Also as shown in FIG. 2, the exhaust treatment system may further include a diesel particulate filter 28 downstream from the SCR catalyst for collecting soot and particulate matter. The diesel particulate filter is preferably a wall flow filter comprising a highly porous filter substrate having a porosity of from about 30 to 80%. The size of the pores preferably range from about 10 to 50 μm. It should be appreciated that the distribution of pore sizes may vary throughout the filter substrate.

Suitable filter substrates include refractory inorganic oxides or ceramic or metal materials, such as cordierite, mullite, silicon carbide, aluminum titanate, alpha-alumina, silica, and alkali and alkaline earth zirconium phosphates (NZP).

Figure 3:
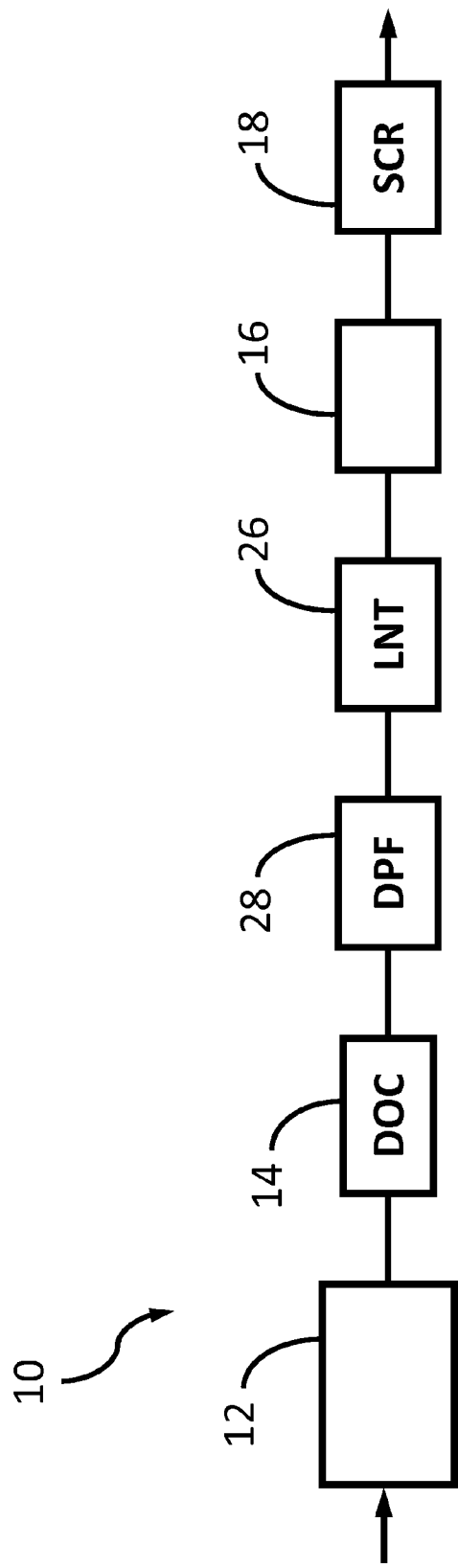
FIG. 3 is a schematic illustration of another embodiment of the invention.
Figure 4:
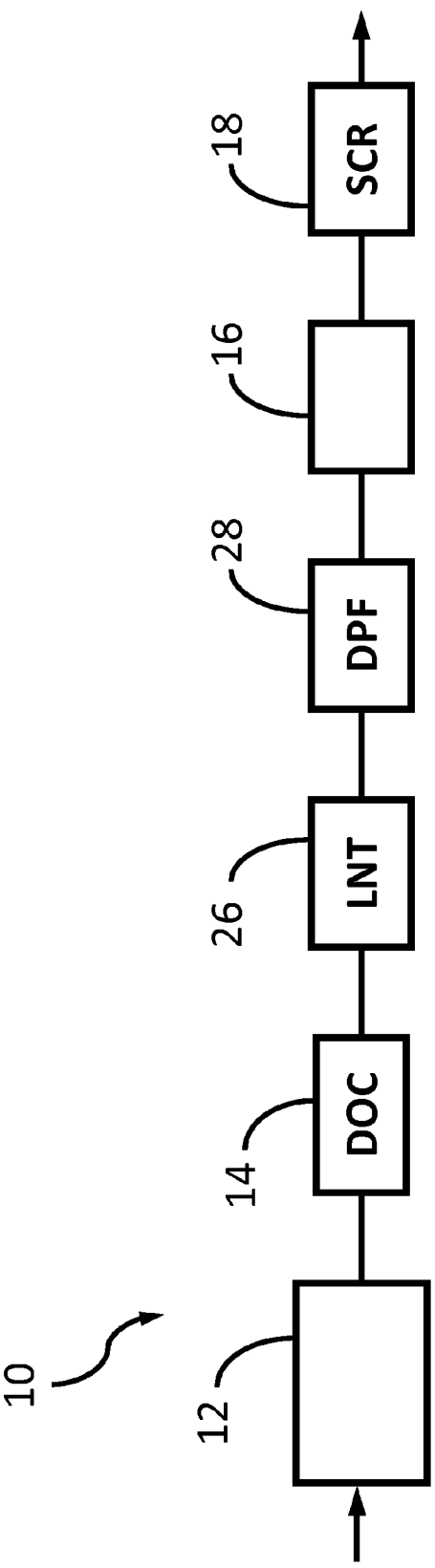
FIG. 4 is a schematic illustration of another embodiment of the invention.

In an alternative embodiment illustrated in FIG. 3, the positions of the diesel particulate filter 28 and LNT 26 may be configured such that the DPF 28 is positioned directly downstream from DOC catalyst 14, and LNT 26 is positioned directly downstream from diesel particulate filter 28. In yet another alternative embodiment illustrated in FIG. 4, the positions of the LNT and DPF are reversed.

Figure 5:
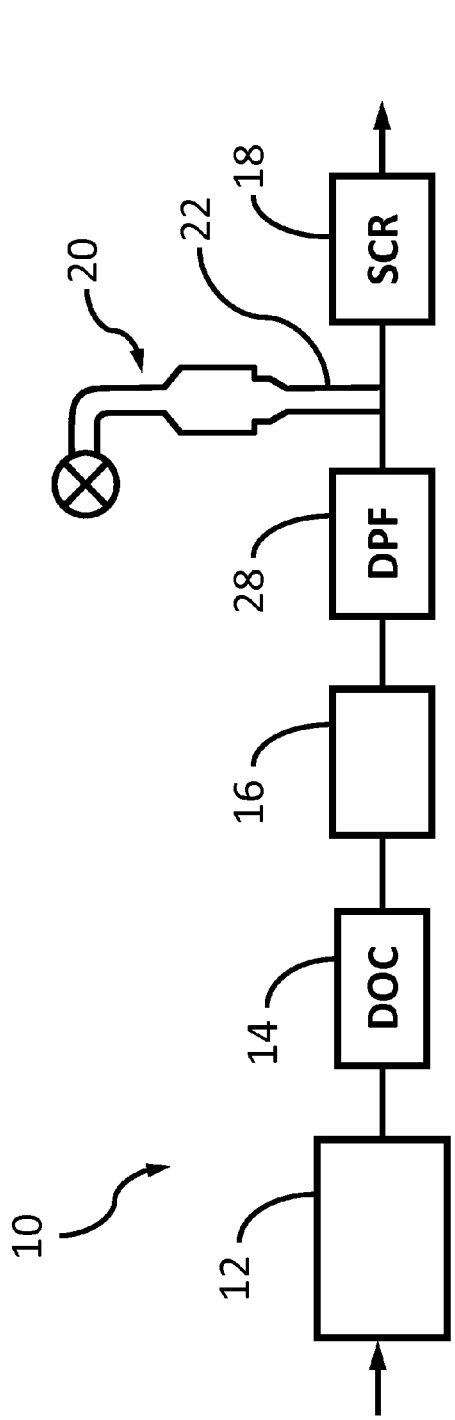
FIG. 5 is a schematic illustration of another embodiment of the invention.

In yet another embodiment illustrated in FIG. 5, the system includes a diesel particulate filter 28 which is positioned between the platinum group metal trap 16 and the SCR catalyst 18.

Figure 6:
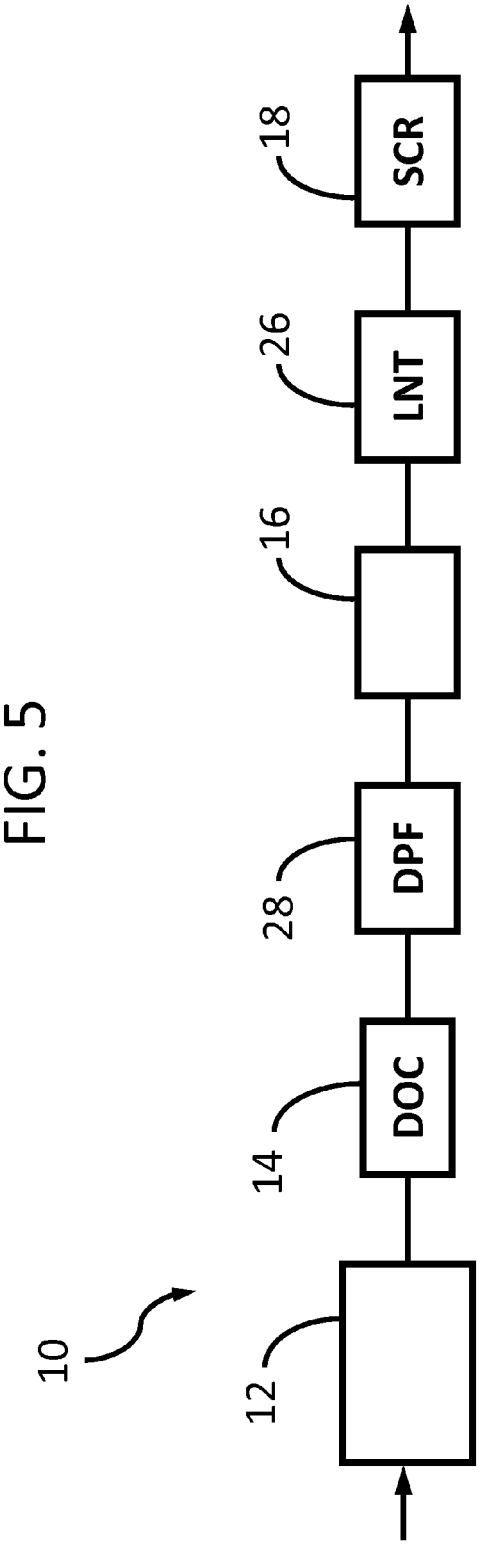
FIG. 6 is a schematic illustration of another embodiment of the invention.

In yet another embodiment illustrated in FIG. 6, the diesel particulate filter 28 is positioned between the DOC 14 and the trapping device 16, and the LNT 26 is positioned between the trapping device 16 and the SCR catalyst 18.

Referring again to FIG. 1, during operation, as exhaust gas generated by a diesel engine (not shown) passes through the exhaust gas manifold 12, it passes through the diesel oxidation catalyst 14 such that conversion of uncombusted HC and CO to $H_2O$ and $CO_2$ occurs. The exhaust gas then flows through the platinum group metal trapping device followed by the SCR catalyst. The exhaust gas then flows toward an exhaust gas outlet (not shown).

As the gas passes through the SCR catalyst 18, the catalyst removes $NO_x$ from the gas stream by selective catalytic reduction with a source of ammonia supplied from the reductant delivery system 20. Typically, the reductant delivery system 20 utilizes a liquid urea/water solution which is injected downstream from the DOC catalyst 14 at metered intervals. The injected liquid urea/water mixture vaporizes and hydrolyzes to form ammonia. Thus, the $NO_x$ component in the gas is converted with selective catalytic reduction of $NO_x$ with ammonia to form nitrogen.

Having described the invention in detail and by reference to preferred embodiments thereof, it will be apparent that modifications and variations are possible without departing from the scope of the invention.

What is claimed is:

1. A method for treating diesel engine exhaust gases comprising:
   providing an exhaust gas treatment system in an exhaust stream comprising a diesel oxidation catalyst comprised of a platinum group metal; a platinum group metal trap comprising cerium oxide or a perovskite material positioned downstream from said diesel oxidation catalyst adapted to trap platinum group metals released from said diesel oxidation catalyst; and a selective reduction catalyst (SCR) positioned downstream from said platinum group metal trap; and
   passing exhaust gases through said exhaust gas treatment system to convert a portion of $NO_x$ in said exhaust stream to $N_2$ and to convert a portion of CO and HC in said exhaust stream to $CO_2$ and $H_2O$; wherein said platinum group metal trap reduces platinum contamination on said SCR catalyst in comparison with an exhaust system which does not include a platinum group metal trap.

2. The method of claim 1 wherein said perovskite material comprises $CaTiO_3$.

3. The method of claim 1 including providing a source of ammonia or urea to said exhaust stream.

4. The method of claim 1 wherein said treatment system includes a diesel particulate filter positioned downstream from said SCR catalyst and downstream from said diesel oxidation catalyst.

5. The method of claim 1 wherein said treatment system includes a diesel particulate filter positioned upstream or downstream from said platinum group metal trap and downstream from said diesel oxidation catalyst.

6. The method of claim 1 wherein said treatment system further includes a lean $NO_x$ trap positioned upstream or downstream from said platinum group metal trap and downstream from said diesel oxidation catalyst.

7. A diesel exhaust gas treatment system comprising:
   a diesel oxidation catalyst comprising a platinum group metal positioned in an exhaust stream;
   a selective catalytic reduction (SCR) catalyst positioned downstream from said diesel oxidation catalyst;
   a platinum group metal trap comprising cerium oxide or a perovskite material positioned between said diesel oxidation catalyst and said selective catalytic reduction (SCR) catalyst and adapted to trap platinum group metals released from said diesel oxidation catalyst and reduce platinum contamination on
   said selective catalytic reduction (SCR) catalyst.

8. The treatment system of claim 7 wherein said perovskite material comprises $CaTiO_3$.

9. The treatment system of claim 7 including a diesel particulate filter positioned downstream from said SCR catalyst.

10. The treatment system of claim 7 including a diesel particulate filter positioned downstream from said platinum group metal trap and downstream from said diesel oxidation catalyst.

11. The treatment system of claim 7 including a diesel particulate filter positioned upstream from said platinum group metal trap and downstream from said diesel oxidation catalyst.

12. The treatment system of claim 7 including a lean NOx trap positioned upstream from said platinum group metal trap and downstream from said diesel oxidation catalyst.

13. The treatment system of claim 7 including a lean NOx trap positioned downstream from said platinum group metal trap and downstream from said diesel oxidation catalyst.

14. The treatment system of claim 7 including a reductant delivery system for providing a source of ammonia or urea to said exhaust stream.

15. The treatment system of claim 14 wherein said reductant delivery system is positioned directly upstream from said SCR catalyst.

16. The treatment system of claim 7 wherein said SCR catalyst comprises zeolite and a base metal selected from copper and iron.

17. The treatment system of claim 7 wherein said diesel oxidation catalyst comprises a combination of platinum and palladium.

\* \* \* \* \*